(12) United States Patent
Saltwell et al.

(10) Patent No.: US 8,601,366 B2
(45) Date of Patent: Dec. 3, 2013

(54) VISUALIZATION AND EDITING OF COMPOSITE LAYOUTS

(75) Inventors: Erik A. Saltwell, Seattle, WA (US); Christian Schormann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 14 days.

(21) Appl. No.: 13/228,371

(22) Filed: Sep. 8, 2011

(65) Prior Publication Data

US 2013/0067323 A1   Mar. 14, 2013

(51) Int. Cl.
*G06F 17/22* (2006.01)
*G06F 17/24* (2006.01)

(52) U.S. Cl.
USPC ........... 715/234; 715/235; 715/236; 715/243; 715/249; 715/255; 715/273; 715/277

(58) Field of Classification Search
USPC ......... 715/234, 235, 236, 243, 249, 255, 273, 715/277
See application file for complete search history.

(56) References Cited

U.S. PATENT DOCUMENTS

| | | | | |
|---|---|---|---|---|
| 5,515,490 | A * | 5/1996 | Buchanan et al. | 715/209 |
| 5,659,639 | A * | 8/1997 | Mahoney et al. | 382/309 |
| 6,108,010 | A * | 8/2000 | Boezeman et al. | 345/676 |
| 7,231,144 | B2 * | 6/2007 | Tanaka et al. | 396/153 |
| 7,380,207 | B2 | 5/2008 | Roudot | |
| 7,477,263 | B2 | 1/2009 | Saillet et al. | |
| 7,949,946 | B2 | 5/2011 | Mollicone et al. | |
| 2005/0253847 | A1 | 11/2005 | Grassia et al. | |
| 2006/0055700 | A1 * | 3/2006 | Niles et al. | 345/473 |
| 2007/0013699 | A1 | 1/2007 | Nelson et al. | |
| 2008/0120534 | A1 | 5/2008 | Moore | |
| 2008/0303827 | A1 | 12/2008 | Schiff | |
| 2009/0100084 | A1 | 4/2009 | Jayadevan et al. | |
| 2010/0235769 | A1 | 9/2010 | Young et al. | |

OTHER PUBLICATIONS

Dan B. Goldman et. al., Schematic Storyboarding for Video Visualization and Editing, Pub. Date: Jul. 2006, SIGGRAPH '06, (10 pages).
Layout overview, http://msdn.microsoft.com/en-us/library/cc295017(d+printer).aspx, (1 page), Date: Jun. 30, 2011.
Recurring User Interface Designs, Jun. 30, 2011 (Retrieved Date), (103 pages).

* cited by examiner

*Primary Examiner* — Stephen Hong
*Assistant Examiner* — Wilson Tsui
(74) *Attorney, Agent, or Firm* — Workman Nydegger (57) ABSTRACT

A computer-assisted visualization and potential adjustment of the layout of a document element involve multiple layout processes being sequentially applied. One set of one or more layout processes are applied to the element to determine an intermediate position of the element with respect to its initial position. Then, another set of one or more layout processes are applied to the element to determine a final position of the element. Rather than displaying just the final position on the display, the initial position, the intermediate position, and the final position of the element are all displayed. An intermediate control may be used to change the first set of one or more layout processes by moving the displayed intermediate position of the element. A final control may be used to change the second set of one or more layout processes by moving the displayed final position of the element.

26 Claims, 10 Drawing Sheets

VISUALIZATION AND EDITING OF COMPOSITE LAYOUTS

BACKGROUND

A web page that is downloaded to a client browser includes markup language, potentially some multi-media files, and potentially some script code. The markup language is most commonly HyperText Markup Language (HTML) and is interpretable by the browser to define structure of the web page, along with some or potentially all of the content. The multi-media files may include video or images rendered automatically within the layout of the web page, or that may be rendered in response to execution of one or more controls. The script code allows the page to have more dynamic functionality and may be executed automatically and/or in response to a user interacting with controls on the page. Javascript is an example of a script coding language.

The web page typically includes one or more elements. As the web page is rendered, each element is positioned within the web page. Some user interface platforms allow multiple layout processes to be performed in sequence for the element. For instance, an element may first have a default position that it would have absent any direction. The web page itself may override this default position by containing an expression of the element's position. For instance, in the context of a HyperText Markup Language (HTML) web page, this is called the "in-flow" position. Style sheets may also apply other layout positions that would further change this position. When multiple layout processes are applied, they are typically applied in sequence. Once the final layout is determined, the element may be rendered in its proper position.

BRIEF SUMMARY

At least one embodiment described herein relates to the computer-assisted visualization of the layout of an element of a document in the case where multiple layout processes are used to determine a final position of the element of the document. An initial position of the element is first determined. Then, a first set of one or more layout processes are applied to the element to determine an intermediate position of the element with respect to the initial position. Following that, a second set of one or more layout processes are applied to the element to determine a final position of the element with respect to the intermediate position of the element. Rather than represent just the final position on the display, the embodiment causes all of the initial position, one or more intermediate positions, and the final position of the element to be represented on the display. In more specific embodiments, a representation of one or more transformations performed when applying the layout processes may also be visualized to allow a designer to see all of the layout processes that the element went through in order to arrive at the final position of the element.

In one or more embodiments, the first set of one or more layout processes may be changed by the user interfacing with an intermediate control to move the representation of the intermediate position of the element as represented on the display. Alternatively or in addition, the second set of one or more layout processes may be changed by the user interfacing with a final control to move the representation of the final position of the element as represented on the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the computer-assisted visualization and potentially adjustment of the layout of an element of a document is described in the case where multiple layout processes are used to determine a final position of the element of the document. One set of one or more layout processes are applied to the element to determine an intermediate position of the element with respect to the initial position of the element. Then, another set of one or more layout processes are applied to the element to determine a final position of the element with respect to the intermediate position. Rather than displaying just the final position on the display, the initial position, the intermediate position, and the final position of the element are all displayed. An intermediate control may be used to change the first set of one or more layout processes by moving the displayed intermediate position of the element. A final control may be used to change the second set of one or more layout processes by moving the displayed final position of the element.

First, some introductory discussion regarding computing systems will be described with respect to FIG. 1. Then, the embodiments of the layout design process will be described with respect to FIGS. 2 through 6.

Figure 1:
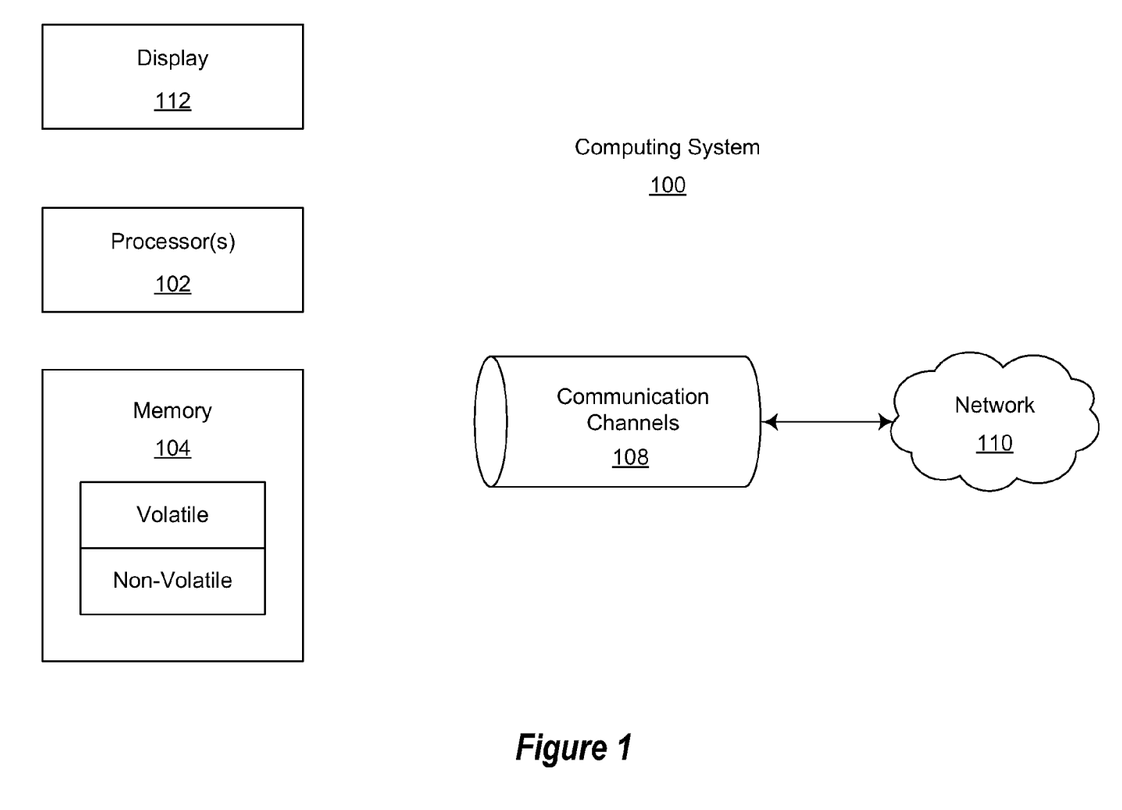
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
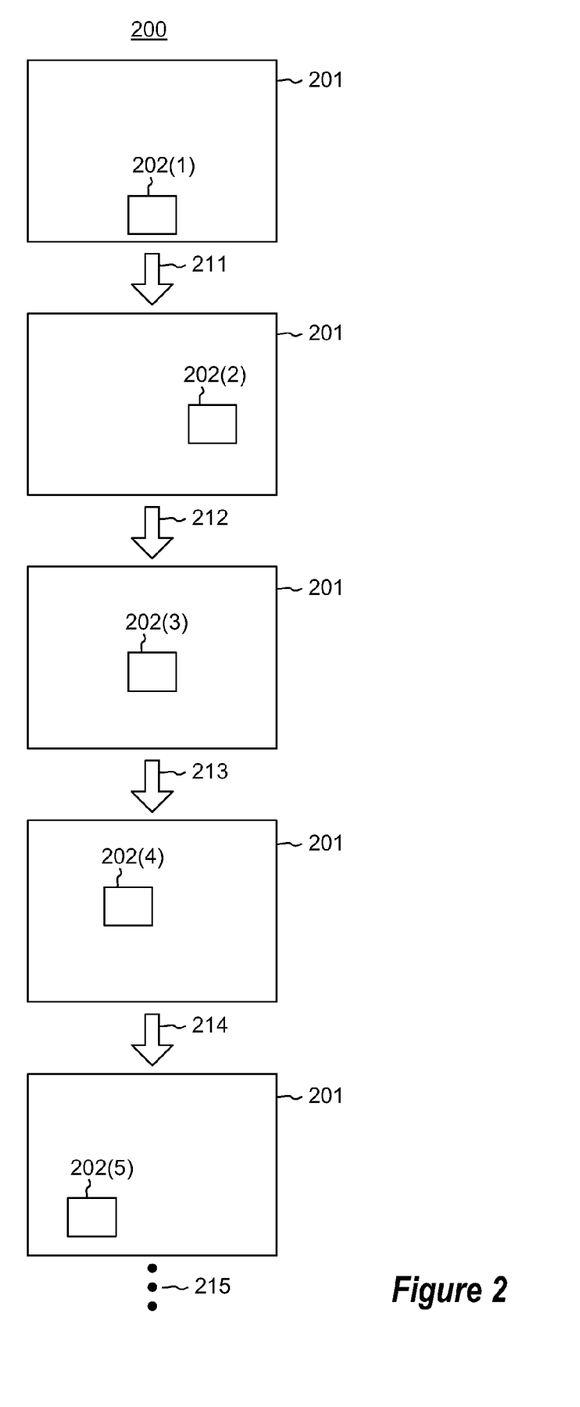
FIG. 2 illustrates an example sequence of four sequential layout processes being applied to an element in the context of a document space corresponding to a document.

In accordance with the principles described herein, a sequence of multiple layout processes are applied to an element that is to be rendered within a document on a display. As an example, the document may be a page such as a web page, or perhaps a screen of a desktop application. FIG. 2 illustrates an example sequence 200 of four sequentially applied layout processes 211 through 214 being applied to an element within a document space 201 corresponding to a document. However, the principles described herein may apply to any plural number of sequentially applied layout processes.

Furthermore, the principles described herein apply regardless of the type of layout process. In the context of an HTML web page, and using CSS, there are several layout processes that may be sequentially applied. Examples in CSS include absolute positioning, relative position, and transforms. However, the principles described herein are not limited to CSS as the platform for the layout processes, nor to these specific types of layout processes.

Each of sequentially applied layout processes determines a subsequent position of the element based on a prior position of the element. For instance, the sequence 200 illustrates five different states of a document space 201 in which the element 202 is in a different position. The five different positions of the element 202 are presented from its initial position 202(1), all the way to the fifth position 202(5), with the suffix identifying the order of the position. At this point, the document need not actually be rendered, but the sequence represents how the calculated position of the element changes with each applied layout processes.

Walking though the sequence 200, the element is in an initial state 202(1) within the document space 201. As an example, this might be a default position for the element 202 absent any applied layout processes. As the documents are rendered, the document description (e.g., the HTML) may specify where to put the element 202. Alternatively, perhaps there is no position designated for the element 202 in the document description (e.g., the HTML), in which case the initial position 202(1) is a default position.

In this example sequence 200, the first layout process 211 is first applied to cause the element 202 to move to a second position 202(2). Then, the second layout process 212 is applied to cause the element 202 to move to a third position 202(3). Next, the third layout process 213 is applied to cause the element 202 to move to a fourth position 202(4). Finally, the fourth layout process 214 is applied to cause the element 202 to move to a fifth position 202(5). The ellipses 215 represent that further layout processes may be applied if desired. In this specific example, the layout processes moved the element to certain locations within the document space. However, the principles described herein are not limited to the specific movement of the element caused by each layout process, as such movement will be a function of the layout process itself. Although each of the layout processes may be a single layout process, they themselves may also include a sequence of constituent layout operations.

Once each of the positions of the element are calculated, the positions may be visualized (e.g., represented on a display). Recall that the principles described herein may be applied to any multiple numbers of sequentially applied layout processes. Thus, such a calculation would result in the identification of an initial position of the element, a final position of the element, and at least one intermediate position of the element.

Figure 3:
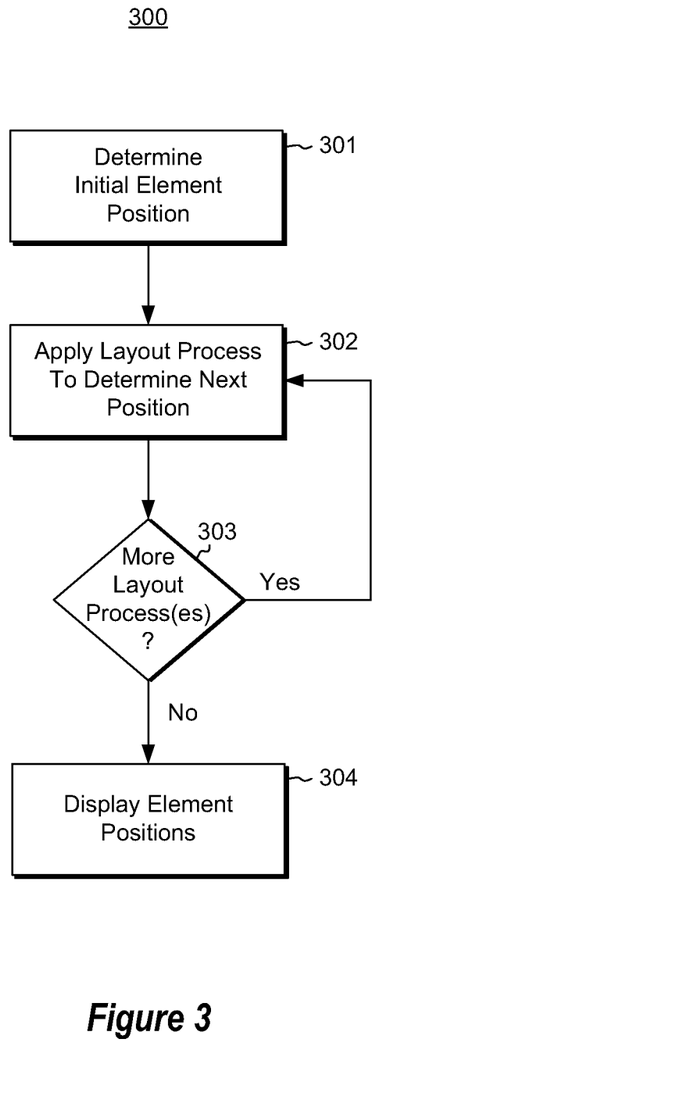
FIG. 3 illustrated a flowchart of a method for causing the document element to be displayed with its initial position, and the subsequent positions.

FIG. 3 illustrated a flowchart of a method 300 for causing the document element to be displayed within is initial position, and the subsequent positions. As an example only, the method 300 will be described with reference to the example sequence 200 of FIG. 2. The method 300 may be performed by the computing system 100 of FIG. 1 in response to the execution of computer-executable instructions that are part of a computer program product.

The method 300 includes a computing system determining an initial position of an element of a document (act 301). For instance, referring to FIG. 2, the initial position 202(1) of the element 202 is determined in the context of the document space 201. Once again, this may occur by interpreting the document description (i.e., the HTML), applying a default position, or otherwise by determining where the element would be placed absent the application of any of the sequential layout processes.

The computing system then applies a set of one or more layout processes to the element to determine a next position of the element (act 302) with respect to the prior position of the element. Returning to FIG. 2, the layout process 211 is applied to determine a next position 202(2) of the element 202 within the document space 201. Then processing branches whether or not there are more layout process sets to apply (decision block 203). Here, suppose that there are (Yes in decision block 303). The processing then returns to apply more layout processes to the element.

The computing system then applies another set of one or more layout processes to the element to determine a next position of the element (act 302) with respect to the prior position of the element. Returning to FIG. 2, the layout process 212 is applied to determine a third position 202(3) of the element 202 within the document space 201. Then processing then again branches whether or not there are more layout process sets to apply (decision block 303). In the example provided with respect to FIGS. 4A through 4C, there are only three calculated positions (the initial position, a single intermediate position, and a final position) of the element. Accordingly, in the example of FIGS. 4A through 4C, there are no further layout processes to be applied (No in decision block 303), and thus the computing system would thus render the element positions on a display (act 304). However, in the example provided with respect to FIGS. 5A through 5C, there are five calculated positions (the initial position, three intermediate positions, and a final position) of the element. Accordingly, in the case of FIGS. 5A through 5C, there are further layout process sets to be applied (Yes in decision block 303), and thus the computing system would return to apply further layout process sets.

Figure 5A:
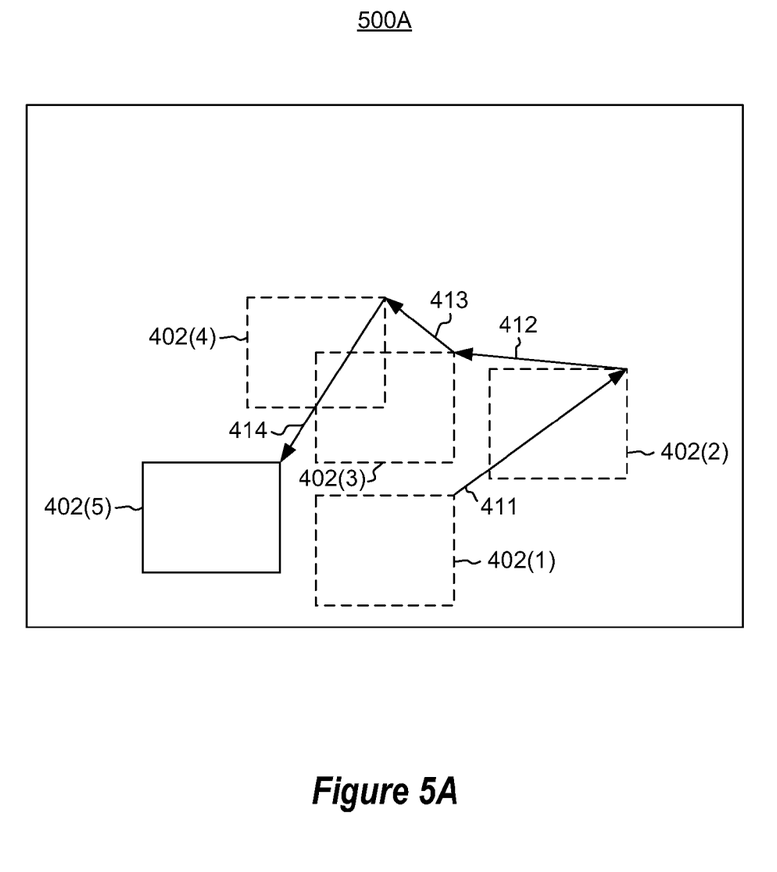
FIG. 5A illustrates a user interface that shows the final position of an element, and the four prior positions of the element, in the case in which four sequential layout process are applied.
Figure 5B:
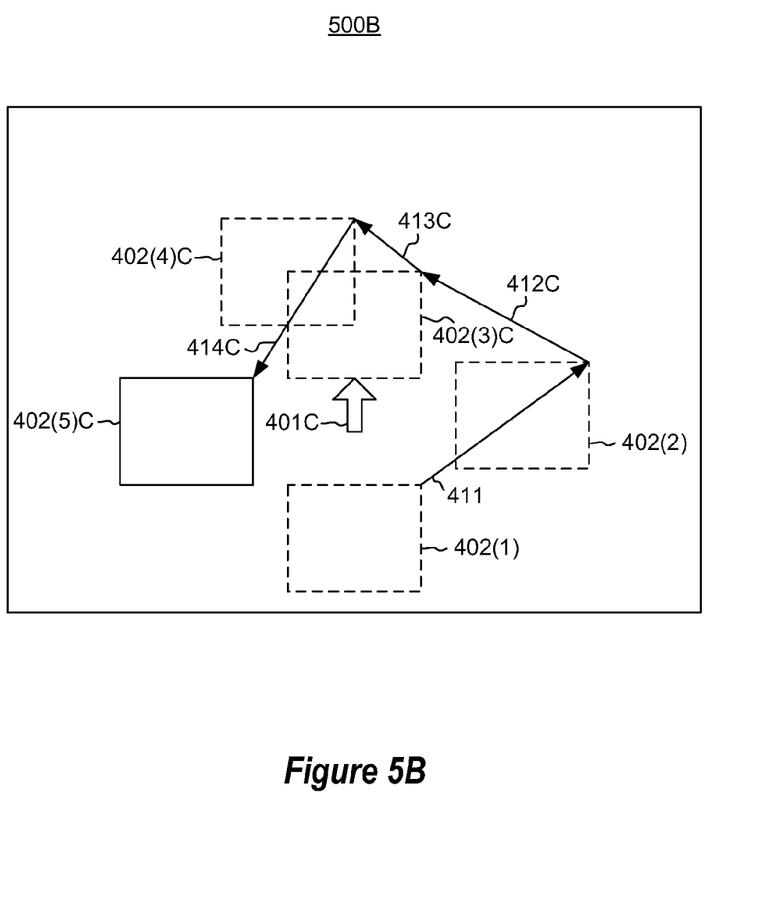
FIG. 5B illustrates the user interface of FIG. 5A in which the visualization representing the third position is adjusted upwards.
Figure 5C:
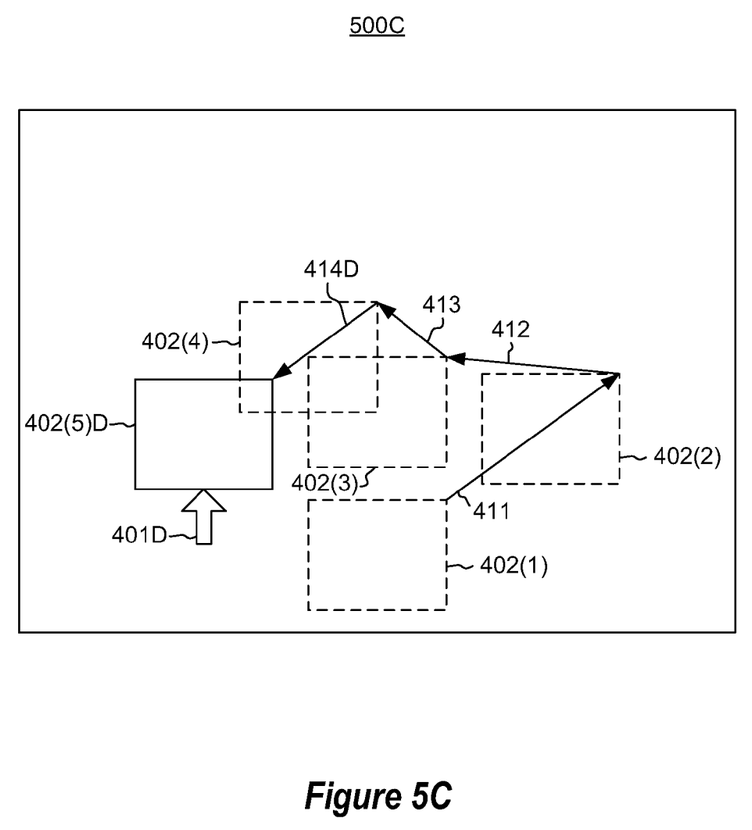
FIG. 5C illustrates the user interface of FIG. 5A in which the visualization representing the final position is adjusted upwards.

In the case of FIG. 5A through 5C, the computing system then applies a set of one or more layout processes to the element to determine a fourth position of the element (act 302) with respect to the third position of the element. Returning to FIG. 2, the layout process 213 is applied to determine the fourth position 202(4) of the element 202 within the document space 201. Here, in the case of FIGS. 5A through 5C, there is yet one further layout process set to be applied (Yes in decision block 303). The processing then returns to apply that final layout process set to the element.

In the case of FIG. 5A through 5C, the computing system then applies a final set of one or more layout processes to the element to determine a final position of the element (act 302) with respect to the fourth position of the element. Returning to FIG. 2, the layout process 214 is applied to determine the fifth position 202(5) of the element 202 within the document space 201. Here, in the case of FIGS. 5A through 5C, all of the layout processes have been applied (No in decision block 303), and thus the computing system then renders the five positions of the element on the display.

In some embodiments, and in the examples of FIGS. 4A through 4C, and 5A through 5C, it is not just the various calculated positions of the element that are represented on a display, but also the transformations (i.e., the movement) of the element from one position to the next as the corresponding set of layout processes are applied are visualized. As will be explained with respect to the examples of FIGS. 4A through 4C, and 5A through 5C, the rendered positions and further provided with a control corresponding to each of the displayed positions of the elements that when manipulated by a user allows the user to move the corresponding position of the element as represented on the display with respect to the prior position of the element as represented on the display. This causes the corresponding set of one or more processes to be changed so that the next time the set of one or more processes are applied, the moved position is arrived at with respect to the prior position. Thus, not only may the user visualize the various positional changes that occurred in laying out the element before the final position was reached, but the user may also change the final position of the element by choosing which of the multiple sets of layout processes should be altered.

Figure 4A:
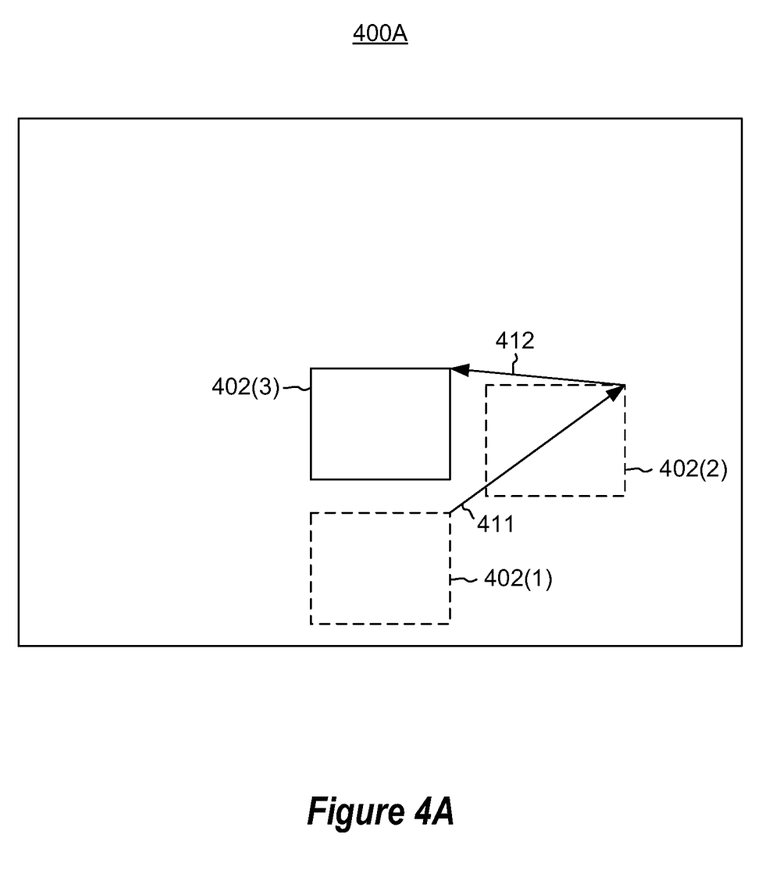
FIG. 4A illustrates a user interface that shows the final position of an element, and the prior positions of the element, in the case in which two sequential layout process are applied.

FIG. 4A illustrates a user interface 400A in which there are three positions of the element calculated, and represents an example of how the positions of the element might be rendered in the case of only performing the first two processes 211 and 212 of FIG. 2.

Visualized initial element position 402(1) is the visualized representation of the initial position 202(1) of the element 202 of FIG. 2. Arrow 411 is a visualized representation of the element movement caused by the application of layout process 211. Visualized element position 402(2) is the visualized representation of the second (i.e., the intermediate) position 202(2) of the element 202 of FIG. 2. Arrow 412 is a visualized representation of the element movement caused by the application of layout process 212. Visualized element position 402(3) is the visualized representation of the third (i.e., the final) position 202(3) of the element 202 of FIG. 2. In one embodiment, the final position of the element may be visually distinguished from the prior positions, since it is the final position of the element that would be evident upon rendering the document. The prior positions are only visible because the user interface 400A is that of a design tool.

Figure 4B:
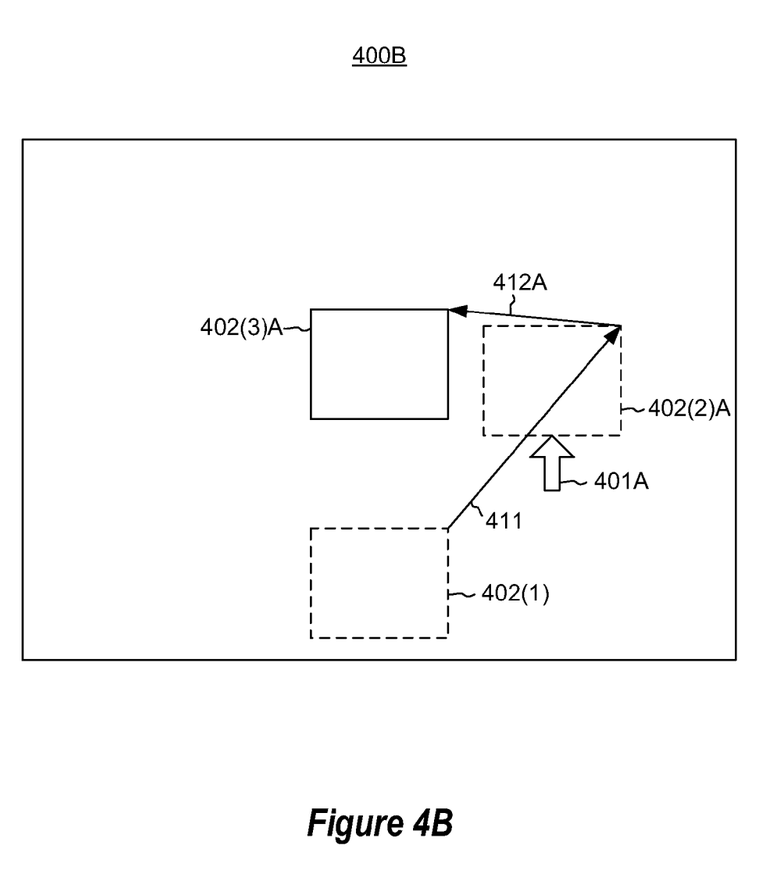
FIG. 4B illustrates the user interface of FIG. 4A in which the visualization representing the intermediate position is adjusted upwards.
Figure 4C:
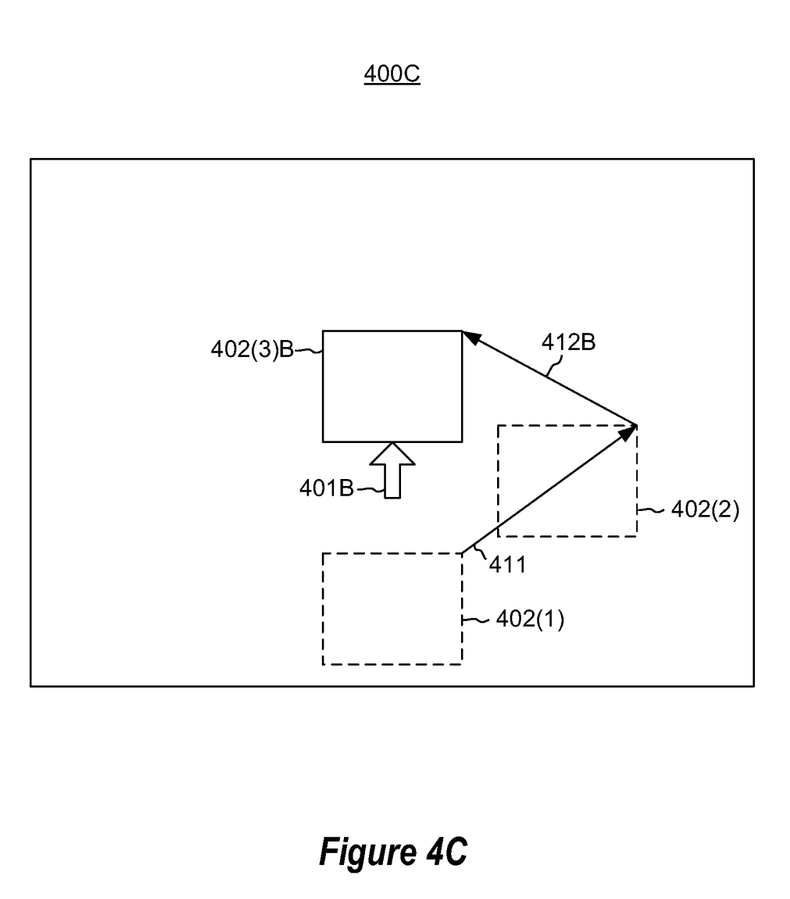
FIG. 4C illustrates the user interface of FIG. 4A in which the visualization representing the final position is adjusted upwards.

FIGS. 4B and 4C illustrate the principle the designer has fine-grained control over whether to change the layout process 211 or the layout process 212, or both. FIG. 4B, for example, illustrates a state 400B of the user interface as compared to a prior state 400A of the user interface. In the state 400B, the designer has moved a control corresponding to the intermediate position 202(2) of the element 202. Specifically, in this case, the control is actually the same as the visualized representation 402(2) of that intermediate position 202(2). In the example, the designer moves the visualized representation 402(2) upwards as represented by arrow 401A. Note that arrow 401A in FIG. 4A, and arrows 401B through 401D in subsequent figures, represent movement of a control, and might not actually be displayed.

This movement 401A has not changed the visualization 402(1) of the initial position 202(1) as this movement has not caused a change in the initial position 202(1) of the element 202. However, the movement 401A has changed the visualization 402(2) of the intermediate position 202(2) to a different position 402(2)A. This is because the designer moving 401A the visualization 402(2) has caused a corresponding change in the layout process 211 such that the application of the layout process 211 would cause the intermediate position 202(2) of the element to move upward as represented by the visualization 402(2)A. The movement 401A has not changed the layout process 212, and thus the relative position of the final position 202(3) with respect to the intermediate position 202(2) remains unchanged. Nevertheless, since the visualization 402(2) of the intermediate position 202(2) experienced translational movement, the visualization 402(3) of the final position 202(3) of the element likewise experiences translational movement as represented by visualization 402(3)A, and the arrow 412 also is moved as represented by arrow 412A.

FIG. 4C, for example, illustrates another state 400C of the user interface as compared to a prior state 400A of the user interface. In the state 400C, the designer has moved a control corresponding to the final position 202(3) of the element 202. In this case, the control is again the same as the visualized representation 402(3) of that final position 202(3). In the example, the designer moves the visualized representation 402(3) upwards as represented by arrow 401B.

This movement 401B has not changed the visualization 402(1) of the initial position 202(1) as this movement has not caused a change in the initial position 202(1) of the element 202. Likewise, the visualization 411 of the layout process 211 has not changed as this movement 401B has also not changed the layout process 211. Furthermore, this movement 401B has not changed the visualization 402(2) of the intermediate position 202(2) as this movement has not caused a change in the intermediate position 202(2) of the element 202 either. However, the movement 401B has changed the visualization 402(3) of the final position 202(2) to be moved to a different position 402(3)B. This is because the designer moving 401B the visualization 402(3) has caused a corresponding change in the layout process 212 such that the application of the layout process 212 would cause the final position 202(3) of the element to move upward as represented by the visualization 402(3)B.

Thus, the designer may elect to change layout process 212 by moving one control (e.g., the visualization 402(3)) or may elect to change the layout process 211 by moving the other control (e.g., the visualization 402(2)). Accordingly, when moving the element from one final position to another in the case in which multiple layout processes have been applied to arrive at the final position, the designer may choose which of the layout processes are to change to cause the change in the final position.

FIG. 5A illustrates a user interface 500A in which there are five positions of the element calculated, and represents an example of how the positions of the element might be rendered in the case of performing all four processes 211 through 214 of FIG. 2. Here, the visualizations 402(1) through 402(5) each represent corresponding calculated positions 202(1) through 202(5) of the element 202 of FIG. 2. Arrows 411 through 414 are each visualized representation of the element movement caused by the application of corresponding layout processes 211 through 214.

FIGS. 5B and 5C again illustrate the principle that the designer has fine-grained control over which the layout process 211 through 214 to change when moving the final position of the element. FIG. 5B illustrates a process of changing layout process 212 by moving visualization 402(3), and FIG. 5C illustrates a process of changing layout process 214 by moving visualization 402(5). However, the user interface also permits changing of layout process 211 by moving visualization 402(2), and changing layout process 213 by moving visualization 402(4).

FIG. 5B, for example, illustrates a state 500B of the user interface as compared to a prior state 500A of the user interface. In the state 500B, the designer has moved a control (e.g., the visualization 402(3)) corresponding to the intermediate position (i.e., the second intermediate position) 202(3) of the element 202. In the example, the designer moves the visualized representation 402(3) upwards as represented by arrow 401C.

This movement 401C has not changed the visualization 402(1) of the initial position 202(1), the visualization 402(2) of the first intermediate position 202(2), nor the visualization 411 of the layout process 211, as the movement 401C has not changed such positions 202(1) and 202(2) and layout process 211. However, the movement 401C has changed the visualization 402(3) of the second intermediate position 202(3) to a different position 402(3)C. This is because the designer moving 401C the visualization 402(3) has caused a corresponding change in the layout process 212 such that the application of the layout process 212 would cause the second intermediate position 202(3) of the element to move upward as represented by the visualization 402(3)C. The movement 401C has not changed the layout processes 213 and 214, and thus the relative position of the third intermediate position 202(4) and the final position 202(5) with respect to each other and the second intermediate position 202(2) remains unchanged. Nevertheless, since the visualization 402(3) of the second intermediate position 202(3) experienced translational movement, the visualization 402(4) of the third intermediate position 202(4) of the element likewise experiences the translational movement as represented by visualization 402(4)C, the visualization 402(5) of the final position 202(5) of the element likewise experiences translational movement as represented by visualization 402(5)C. Furthermore, arrows 413 and 414 are also translationally moved as represented by arrow 413C and 414C.

FIG. 5C, for example, illustrates another state 500C of the user interface as compared to a prior state 500A of the user interface. In the state 500C, the designer has moved a control corresponding to the final position 202(3) of the element 202. In the example, the designer moves the visualized representation 402(5) upwards as represented by arrow 401D. The movement 401D changes the layout process 214, but does not change layout processes 211 through 213, and thus does not change any of the initial position 202(1) or the intermediate positions 202(2) through 202(4) of the element 202. However, the movement 401D has changed the visualization 402 (5) of the final position 202(5) to a different position 402(5)D. Furthermore, the arrow 414 has been altered to 414D to represent a change in the layout process 214 caused by the movement 401D.

Thus, the designer may elect to change layout process 211 by moving a first control (e.g., the visualization 402(2)), layout process 212 by moving a second control (e.g., the visualization 402(3)), layout process 213 by moving a third control (e.g., the visualization 402(4)), or layout process 214 by moving a fourth control (e.g., the visualization 402(5)). Thus, in this example also, when moving the element from one final position to another in the case in which multiple layout processes have been applied to arrive at the final position, the designer may choose which of the layout processes are to change to cause the change in the final position.

Figure 6:
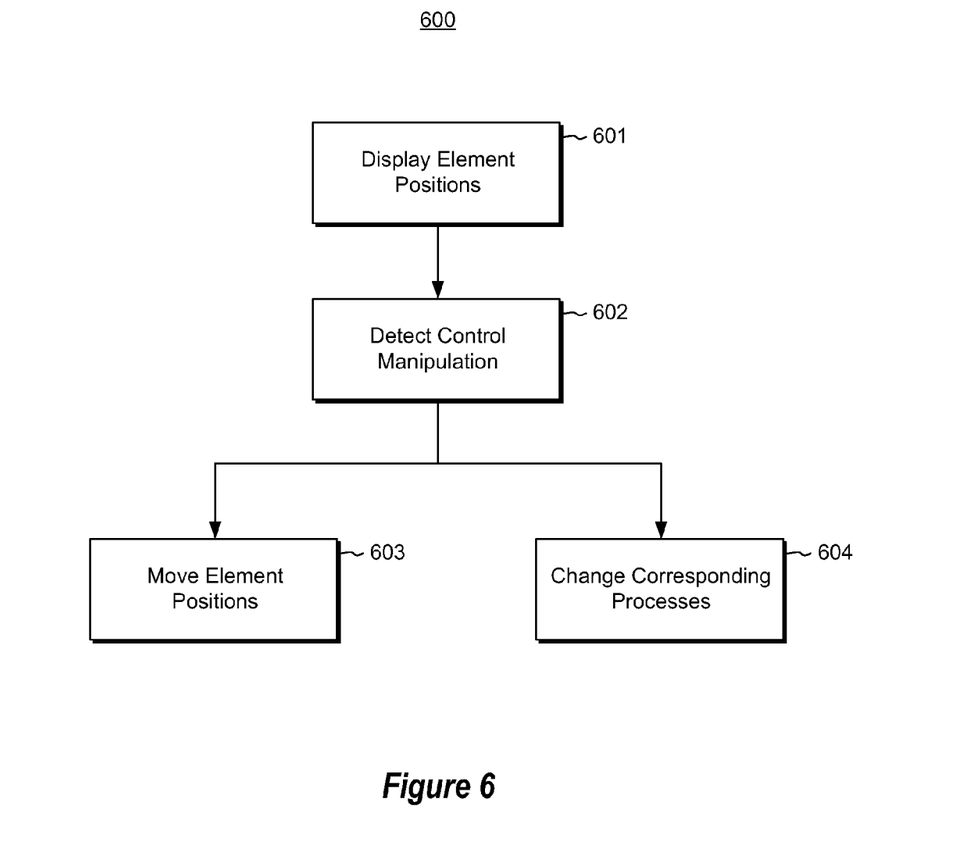
FIG. 6 illustrates a flowchart of a computer-implemented method for adjusting one or more layout processes in a design tool running on a computing system.

FIG. 6 illustrates a flowchart of a computer-implemented method 600 for adjusting one or more layout processes in a design tool running on a computing system. The method 600 has been applied in the example of FIGS. 4A through 4C, and the example of FIGS. 5A through 5C. The method 600 operates in a context in which the various positions of an element are displayed (act 601). For instance, with reference to FIGS. 4A through 4C, the positions 202(1) through 202(3) are represented by visualizations 402(1) through 402(3). With reference to FIGS. 5A through 5C, the positions 202(1) through 202(5) are represented by visualizations 402(1) through 402 (5).

The computing system then detects user manipulation of a control corresponding to a non-initial position of the element (act 602). For instance, in the example of FIGS. 4A through 4C, the user may have manipulated visualization 402(2) (as in the case of FIG. 4B) or visualization 402(3) (as in the case of FIG. 4C). In the example of FIGS. 5A through 5C, the user may have manipulated visualization 402(2) (the manipulation of which not being illustrated by a figure), visualization 402(3) (as in the case of FIG. 4B), visualization 402(4) (the manipulation of which not being illustrated by a figure), or visualization 402(5) (as in the case of FIG. 5C).

In response to manipulation of the control, the corresponding position of the element is moved (act 603) with respect to the prior position of the element. Furthermore, the corresponding layout process used to arrive at the corresponding position is altered (act 604) so that the next time the layout process is applied, the moved position is arrived at.

For instance, in FIG. 4B, the visualization 402(2) is moved from location 402(2) to location 402(2)A. This causes the corresponding position 202(2) to likewise be moved, and thereby causes a change in the layout process 211 as represented by arrow 411 changing to arrow 411A.

In FIG. 4B, the visualization 402(3) is moved from location 402(3) to location 402(3)B. This causes the corresponding position 202(3) to likewise be moved, and thereby causes a change in the layout process 212 as represented by arrow 412 changing to arrow 412B.

Accordingly, the principles of the present invention allow for fine control over which layout process in a sequence of layout process is to be changed when changing the final layout of an element to be rendered on a document. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by one or more processors of a computing system, cause the computing system to perform the following:

an act of determining an initial position of an element of a document that will be displayed when the document is subsequently rendered as a web page, wherein a sequence of multiple layout processes including at least cascading style sheets (CSS) are associated with displaying the element when the document is rendered as the web page, the multiple layout processes including a first set of one or more layout processes and a second set of one or more layout processes;

an act of applying the first set of one or more layout processes to the element to determine an intermediate position of the element with respect to the initial position of the element, wherein the first set of the one or more layout processes are applied to the element when the element is in the initial position;

an act of applying the second set of one or more layout processes to the element to determine a final position of the element with respect to the intermediate position of the element, wherein the second set of the one or more layout processes are applied to the element when the element is in the intermediate position; and subsequent to determining the initial position, the intermediate position and the final position, an act of causing the initial position, the intermediate position, and the final position of the element to be simultaneously represented on a display.

2. The computer program product in accordance with claim 1, wherein the computer-executable instructions are further structured such that, when executed by the one or more processors, the computing system is further configured to perform the following:

an act of providing an intermediate control that when manipulated by a user allows the user to move the intermediate position of the element as represented on the display with respect to the initial position of the element as represented on the display, and causes the first set of one or more processes to be changed so that the next time the first set of one or more processes are applied, the moved intermediate position is arrived at.

3. The computer program product in accordance with claim 2, wherein manipulation of the intermediate control does not change the second set of one or more layout processes.

4. The computer program product in accordance with claim 2, wherein the intermediate position as represented on the display is also the intermediate control.

5. The computer program product in accordance with claim 2, wherein the computer-executable instructions are further structured such that, when executed by the one or more processors, the computing system is further configured to perform the following:

an act of providing a final control that when manipulated by a user allows the user to move the final position of the element as represented on the display with respect to the intermediate position of the element as represented on the display, and causes the second set of one or more processes to be changed so that the next time the second set of one or more processes are applied, the moved final position is arrived at with respect to the intermediate position of the element.

6. The computer program product in accordance with claim 1, wherein the computer-executable instructions are further structured such that, when executed by the one or more processors, the computing system is further configured to perform the following:

an act of providing a final control that when manipulated by a user allows the user to move the final position of the element as represented on the display with respect to the intermediate position of the element as represented on the display, and causes the second set of one or more processes to be changed so that the next time the second set of one or more processes are applied, the moved final position is arrived at with respect to the intermediate position of the element.

7. The computer program product in accordance with claim 6, wherein manipulation of the final control does not change the second set of one or more layout processes.

8. The computer program product in accordance with claim 7, wherein the final position as represented on the display is also the final control.

9. The computer program product in accordance with claim 1, wherein the computer-executable instructions are further structured such that, when executed by the one or more processors, the computing system is further configured to perform the following:

an act of causing a representation of one or more transformations performed during the application of the first set of one or more layout processes to be represented on the display.

10. The computer program product in accordance with claim 9, wherein the computer-executable instructions are further structured such that, when executed by the one or more processors, the computing system is further configured to perform the following:

an act of causing a representation of one or more transformations performed during the application of the second set of one or more layout processes to be represented on the display.

11. The computer program product in accordance with claim 10, wherein the computer-executable instructions are further structured such that, when executed by the one or more processors, the computing system is further configured to perform the following:

an act of providing a final control that when manipulated by a user allows the user to move the final position of the element as represented on the display with respect to the intermediate position of the element as represented on the display, and causes the second set of one or more processes to be changed so that the next time the second set of one or more processes are applied, the moved final position is arrived at with respect to the intermediate position of the element, and causes the displayed representation of the one or more transformations performed during the application of the second set of one or more processes to be changed.

12. The computer program product in accordance with claim 11, wherein manipulation of the final control does not change a relative position of the displayed representation of the intermediate position of the element, the displayed representation of the initial position of the element, and the displayed representation of the one or more transformations performed during the application of the first set of one or more layout processes.

13. The computer program product in accordance with claim 11, wherein manipulation of the intermediate control does not change a relative position of the displayed representation of the final position of the element, the displayed representation of the intermediate position of the element, and the displayed representation of the one or more transformations performed during the application of the second set of one or more layout processes.

14. The computer program product in accordance with claim 9, wherein the computer-executable instructions are further structured such that, when executed by the one or more processors, the computing system is further configured to perform the following:

an act of providing an intermediate control that when manipulated by a user allows the user to move the intermediate position of the element as represented on the display with respect to the initial position of the element as represented on the display, so that the next time the first set of one or more processes are applied, the moved intermediate position is arrived at, and causes the displayed representation of the one or more transformations performed during the application of the first set of one or more processes to be changed.

15. The computer program product in accordance with claim 1, wherein the intermediate position is a first intermediate position, wherein the act of applying a second set of one or more layout processes to the element to determine a final position of the element with respect to the intermediate position of the element comprises:

an act of applying a first subset of the second set of one or more layout processes to the element to determine a second intermediate position of the element with respect to the first intermediate position of the element; and an act of applying a second subset of the second set of one or more layout processes to the element to determine the final position of the element with respect to the second intermediate position of the element.

16. The computer program product in accordance with claim 15, wherein the act of causing the initial position, the intermediate position, and the final position of the element to be represented on a display comprises:

an act of causing the initial position, the first intermediate position, the second intermediate position, and the final position of the element to be represented on the display.

17. The computer program product in accordance with claim 1, wherein the intermediate position is a first intermediate position, wherein the act of applying a second set of one or more layout processes to the element to determine a final position of the element with respect to the intermediate position of the element comprises:

an act of applying a first subset of the second set of one or more layout processes to the element to determine a second intermediate position of the element with respect to the first intermediate position of the element;

an act of applying a second subset of the second set of one or more layout processes to the element to determine a third intermediate position of the element with respect to the second intermediate position of the element; and an act of applying a third subset of the second set of one or more layout processes to the element to determine the final position of the element with respect to the third intermediate position of the element.

18. The computer program product in accordance with claim 17, wherein the act of causing the initial position, the intermediate position, and the final position of the element to be represented on a display comprises:

an act of causing the initial position, the first intermediate position, the second intermediate position, the third intermediate position, and the final position of the element to be represented on the display.

19. A method implemented by a computing system that includes at least one processor for facilitating visualization and editing of composite layouts, the method comprising:

an act of determining an initial position of an element of a document that will be displayed when the document is subsequently rendered as a web page, wherein a sequence of multiple layout processes including at least cascading style sheets (CSS) are associated with displaying the element when the document is rendered as the web page, the multiple layout processes including a first set of one or more layout processes and a second set of one or more layout processes;

an act of the computing system applying the first set of one or more layout processes to the element to determine an intermediate position of the element with respect to the initial position of the element, wherein the first set of the one or more layout processes are applied to the element when the element is in the initial position;

an act of the computing system applying the second set of one or more layout processes to the element to determine a final position of the element with respect to the intermediate position of the element, wherein the second set of the one or more layout processes are applied to the element when the element is in the intermediate position; and subsequent to determining the initial position, the intermediate position and the final position, an act of causing the initial position, the intermediate position, and the final position of the element to be simultaneously represented on a display.

20. The method recited in claim 19, wherein the method further includes:

an act of detecting user manipulation of an intermediate control;

an act of moving the intermediate position of the element as represented on the display with respect to the initial position of the element as represented on the display responsive to the user manipulation of the intermediate control; and an act of causing the first set of one or more processes to be changed so that the next time the first set of one or more processes are applied, the moved intermediate position is arrived at.

21. The method recited in claim 19, the method further comprising:

an act of detecting user manipulation of a final control, wherein manipulation of the final control does not change the first set of one or more layout processes;

an act of moving the final position of the element as represented on the display with respect to the intermediate position of the element as represented on the display responsive to the user manipulation of the final control; and an act of causing the second set of one or more processes to be changed so that the next time the second set of one or more processes are applied, the moved final position is arrived at.

22. A computing system comprising:

at least one processor; and storage having stored computer-executable instructions which, when executed by the at least one processor, perform a method for facilitating visualization and editing of composite layouts, wherein the method includes:

an act of determining an initial position of an element of a document that will be displayed when the document is subsequently rendered as a web page, wherein a sequence of multiple layout processes including at least cascading style sheets (CSS) are associated with displaying the element when the document is rendered as the web page, the multiple layout processes including a first set of one or more layout processes and a second set of one or more layout processes;

an act of applying the first set of one or more layout processes to the element to determine an intermediate position of the element with respect to the initial position of the element, wherein the first set of the one or more layout processes are applied to the element when the element is in the initial position;

an act of applying the second set of one or more layout processes to the element to determine a final position of the element with respect to the intermediate position of the element, wherein the second set of the one or more layout processes are applied to the element when the element is in the intermediate position; and subsequent to determining the initial position, the intermediate position and the final position, an act of causing the initial position, the intermediate position, and the final position of the element to be simultaneously represented on a display.

23. The system of claim 22, wherein the initial position is determined by a document description that specifies where the element should be displayed.

24. The system of claim 22, wherein the document is an HTML document.

25. The system of claim 22, wherein the final position is rendered in a visually distinct manner than a manner in which the initial position and intermediate position are rendered.

26. The system of claim 22, wherein, the document is subsequently rendered as the web page, and wherein the document is rendered without displaying the element at the initial position or the intermediate position.

* * * * *